US007167840B1

(12) United States Patent
Seidman et al.

(10) Patent No.: US 7,167,840 B1
(45) Date of Patent: Jan. 23, 2007

(54) METHOD AND APPARATUS FOR DISTRIBUTING AND SELLING ELECTRONIC CONTENT

(75) Inventors: Lawrence P. Seidman, Irvine, CA (US); William Goliff, Monterey Park, CA (US); Erin H. Sibley, Los Angeles, CA (US)

(73) Assignee: The DirecTV Group, Inc., El Segundo, CA (US)

( * ) Notice: Subject to any disclaimer, the term of this patent is extended or adjusted under 35 U.S.C. 154(b) by 0 days.

(21) Appl. No.: 09/544,833

(22) Filed: Mar. 15, 2000

(51) Int. Cl.
*G06F 17/60* (2006.01)

(52) U.S. Cl. .............................. 705/52; 705/50; 705/51; 705/59; 713/150

(58) Field of Classification Search ............. 705/50–79; 713/150
See application file for complete search history.

(56) References Cited

U.S. PATENT DOCUMENTS

| 5,099,319 A | 3/1992 | Esch et al. |
| 5,168,353 A | 12/1992 | Walker et al. |
| 5,357,276 A | 10/1994 | Banker et al. |

(Continued)

FOREIGN PATENT DOCUMENTS

| WO | WO 91 03112 A | 3/1791 |
| WO | WO 00/62223 | * 10/2000 |

OTHER PUBLICATIONS

Ardissono et al., "An Agenet Architecture for Personalized Web Stores", 1999, ACM, 182–189.*

U.S. Appl. No. 09/564,082, filed May 3, 2000, Sibley et al.

D. Goldberg et al., "Collaborative Filtering to Weave an Information Tapestry", Comm. Of the ACM, vol. 35, No. 12, pp. 61–70, Dec. 1992.

S. Loeb, "Architectural Personalized Delivery of Multimedia Information", Comm. Of the ACM., vol. 35, No. 12, pp. 39–48, Dec. 1992.

B. Sheth et al., "Evolving Agents for Personalized Inofrmation Filtering", Proceed. Of the Ninth IEEE Conf. On Artif. Intell. For Apps., 1993.

U. Shardanand et al., "Social Information Filtering: Algorithms for Automating 'Word of Mouth'", CHI–95 Conf. Proceedings, Denver, May 1995.

Hadjitheodosiou, M.H. Ephremides, A., Friedman, D.; Technical Research Report; Broadband Access via Satellite; CSHCN T.R. 99–2 (ISR T.R. 99–9); www.isr.umd.edu/CSHCN/.

Glenn, Robert et al.; Draft Wireless White Paper; Wireless Information Technology for $21^{st}$ Century; Information Technology Laboratory NIST; Feb. 17, 1999; pp. 14–17.

(Continued)

*Primary Examiner*—James P. Trammell
*Assistant Examiner*—Jalatee Worjloh
(74) *Attorney, Agent, or Firm*—Georgann S. Grunebach

(57) ABSTRACT

A system for distributing electronic content packages has a content provider that has electronic content and a broadcast center. The broadcast center is coupled to the content provider for receiving the electronic content and transmitting a plurality of the electronic to the system users. A user appliance has a filter therein. The appliance is coupled to the broadcast center for receiving the electronic content. The filter filters the plurality of electronic content with predetermined filter terms and accepts one of the plurality of electronic content to form a selected content subset as a function of the filter terms. This process is repeated for the plurality of electronic content.

18 Claims, 2 Drawing Sheets

U.S. PATENT DOCUMENTS

| | | |
|---|---|---|
| 5,410,343 A | 4/1995 | Coddington et al. |
| 5,410,344 A | 4/1995 | Graves et al. |
| 5,412,416 A | 5/1995 | Nemirofsky |
| 5,414,455 A | 5/1995 | Hooper et al. |
| 5,421,031 A | 5/1995 | De Bey |
| 5,434,678 A | 7/1995 | Abecassis |
| 5,440,334 A | 8/1995 | Walters et al. |
| 5,442,390 A | 8/1995 | Hooper et al. |
| 5,446,490 A | 8/1995 | Blahut et al. |
| 5,477,263 A | 12/1995 | O'Callaghan et al. |
| 5,506,615 A | 4/1996 | Awaji |
| 5,543,861 A | 8/1996 | Harradine et al. |
| 5,546,118 A | 8/1996 | Ido |
| 5,559,548 A | 9/1996 | Davis et al. |
| 5,559,549 A | 9/1996 | Hendricks et al. |
| 5,585,858 A | 12/1996 | Harper et al. |
| 5,589,945 A | 12/1996 | Abecassis |
| 5,610,653 A | 3/1997 | Abecassis |
| 5,634,849 A | 6/1997 | Abecassis |
| 5,652,615 A | 7/1997 | Bryant et al. |
| 5,664,046 A | 9/1997 | Abecassis |
| 5,727,065 A | 3/1998 | Dillon |
| 5,737,009 A | 4/1998 | Payton |
| 5,790,935 A * | 8/1998 | Payton ........................ 455/5.1 |
| 5,818,911 A | 10/1998 | Kawashima |
| 5,831,662 A | 11/1998 | Payton |
| 5,915,207 A | 6/1999 | Dao et al. |
| 5,920,626 A | 7/1999 | Durden et al. |
| 5,995,518 A | 11/1999 | Burns et al. |
| 6,073,124 A * | 6/2000 | Krishnan et al. ............. 705/59 |
| 6,091,883 A | 7/2000 | Artigalas et al. |
| 6,160,988 A | 12/2000 | Shroyer |
| 6,160,989 A | 12/2000 | Hendricks et al. |
| 6,226,618 B1 * | 5/2001 | Downs et al. ................. 705/1 |
| 6,301,463 B1 | 10/2001 | Dao et al. |
| 6,381,747 B1 | 4/2002 | Wonfor et al. |
| 6,519,770 B1 | 2/2003 | Ford |
| 6,535,634 B1 | 3/2003 | Schaem |
| 6,543,050 B1 | 4/2003 | Letellier et al. |
| 6,958,987 B1 | 10/2005 | Herring et al. |
| 2001/0039180 A1 | 11/2001 | Sibley et al. |
| 2001/0039662 A1 | 11/2001 | Sibley |
| 2001/0039663 A1 | 11/2001 | Sibley |
| 2001/0039664 A1 | 11/2001 | Sibley |
| 2001/0053700 A1 | 12/2001 | Sibley |
| 2002/0004783 A1 | 1/2002 | Paltenghe et al. |
| 2002/0010757 A1 * | 1/2002 | Granik et al. ............... 709/218 |
| 2002/0095676 A1 | 7/2002 | Knee et al. |
| 2002/0112171 A1 * | 8/2002 | Ginter et al. ............... 713/185 |
| 2002/0124255 A1 | 9/2002 | Reichardt et al. |
| 2002/0129374 A1 | 9/2002 | Freeman et al. |
| 2002/0138831 A1 | 9/2002 | Wachtfogel et al. |
| 2002/0166120 A1 | 11/2002 | Boylan, III et al. |
| 2005/0028208 A1 | 2/2005 | Ellis et al. |

OTHER PUBLICATIONS

Forrest, John R.; IEEE Transactions on Microwave Theory and Techniques, vol. 47, No. 12, Dec. 1999; Communication Networks for the New Millenium.

Bem, Daniel J. et al.; IEEE Communications Surveys & Tutorials; Broadband Satellite Systems; 1$^{st}$ Quarter 2000, vol. 3, No. 1; www.comsoc.org/pubs/surveys.

* cited by examiner

METHOD AND APPARATUS FOR DISTRIBUTING AND SELLING ELECTRONIC CONTENT

TECHNICAL FIELD

The present invention relates generally to broadcasting digital information, and more specifically, to distributing and selling electronic content to a target market.

BACKGROUND ART

Hughes Electronics Corporation provides digital direct broadcast systems such as DIRECTV® and DIRECPC® that broadcast via satellite, television programs and information or computer applications, respectively. DIRECTV® broadcasts television programming in a similar fashion to that of terrestrial television. DIRECPC® subscribers place requests that are queued up and broadcasted, to the subscriber's computer. DIRECPC services on-demand requests. DIRECTV® and DIRECPC® incorporate encryption in addressing for applications such as on-demand requests. These systems provide access control where users make selection decisions in advance of the content being broadcast.

Another type of system, described in U.S. Pat. No. 5,790,935, issued to the present assignee, is a virtual on-demand digital information delivery system. In this system, a central distribution server directs a variety of programs to various users based upon a filtering predictive scheme located at the subscriber's local storage. During off peak hours various programs are downloaded to the subscriber's local storage.

This invention improves upon the previous patent by providing caching of electronic content anytime. Another aspect of the invention is a novel E-Commerce Management System.

SUMMARY OF THE INVENTION

It is therefore one object of the invention to improve bandwidth utilization in the distribution of electronic content. Another object of the invention is to provide an E-Commerce Management System located with the user so that the user transactions are protected.

In one aspect of the invention, a method for distributing electronic content comprises the steps of:

distributing a plurality of electronic content having predetermined user rights associated therewith;

receiving said plurality of electronic content and associated marketing information;

filtering said plurality of electronic content with predetermined filter terms;

accepting one or more of said plurality of electronic content to form a selected content subset as a function of said predetermined filter terms;

locally storing said selected content subset for user review; and reviewing said selected content subset at any time.

The method may also include the steps of reviewing the selected content and purchasing greater rights in the selected content.

In a further aspect of the invention, a system for distributing electronic content packages has a content provider that has electronic content samples and a broadcast center. The broadcast center is coupled to the content provider for receiving the electronic content and transmitting a plurality of the electronic content with marketing information to the system users. A user appliance has a filter therein. The appliance is coupled to the broadcast center for receiving the electronic content with marketing information. The filter filters the plurality of electronic content with predetermined filter terms and accepts one or more of the plurality of electronic content to form a selected content subset as a function of the marketing information and the filter terms.

One advantage of the invention is that various levels of distribution may be provided by the system. For example, various content, restricted rights in the full content or the full content may be provided instantaneously from the user's system. Advantageously, the user may browse the various electronic content items on his system at his leisure with no consumption of bandwidth of the system.

Other objects and features of the present invention will become apparent when viewed in light of the detailed description of the preferred embodiment when taken in conjunction with the attached drawings and appended claims.

BEST MODES FOR CARRYING OUT THE INVENTION

Figure 1:
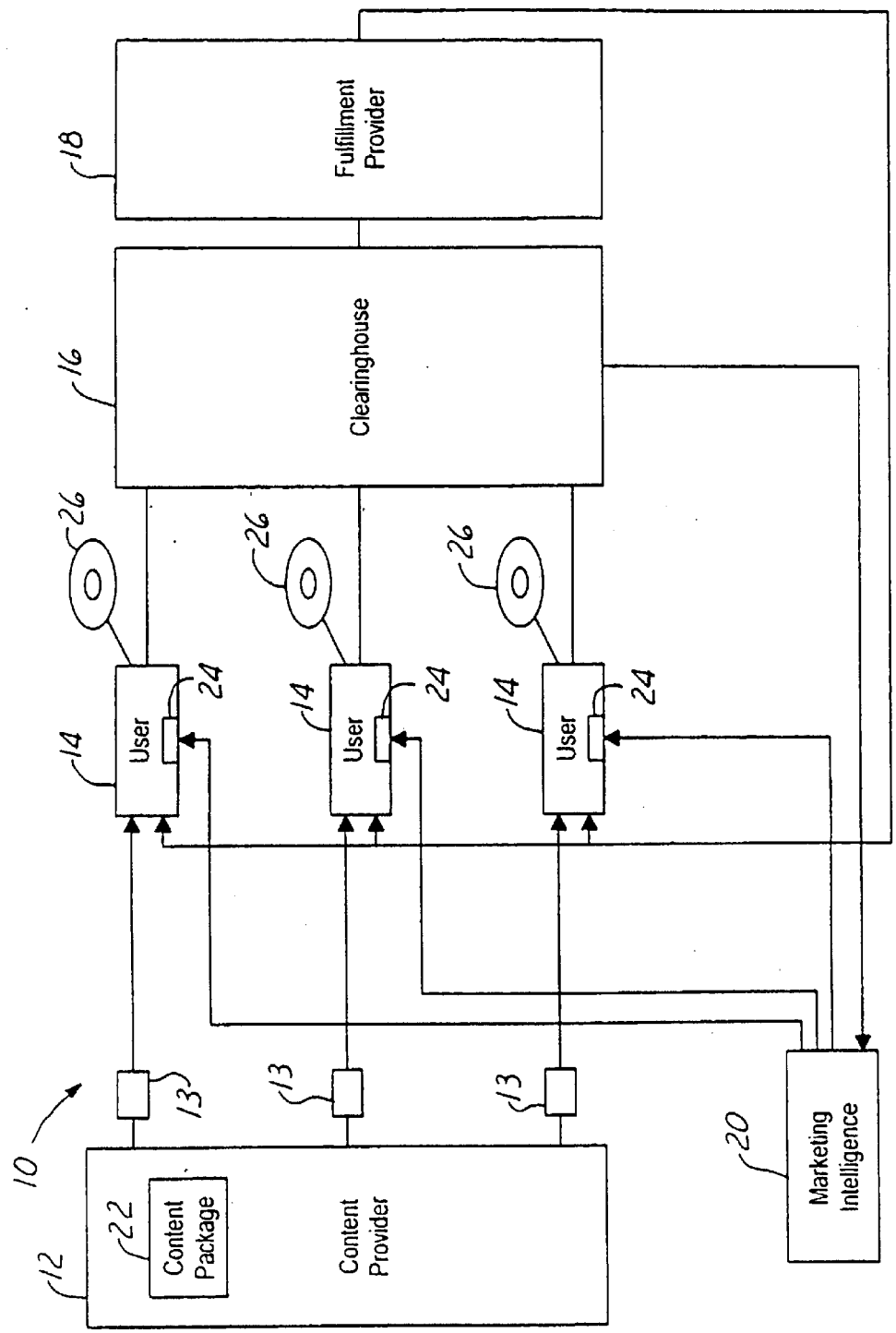
FIG. 1 is a high level block diagram of a distribution system according to the present invention.

In the following figures the same reference numerals will be used to identify the same components in the various views.

As described in this application, "electronic content" is meant to encompass various types of digital information including the distribution of music, videos, movies, music videos, games, advertising, and promotional materials associated with the content.

Referring now to FIG. 1, an electronic content distribution system 10 is illustrated in FIG. 1. In general, a content provider 12 is coupled to users through a digital transport system 13. Users 14 are coupled to a clearinghouse 16 which in turn is coupled to a fulfillment provider 18. Clearinghouse 16 is coupled to a marketing intelligence source 20. Content provider 12 provides the electronic content to be distributed to users 14 in a content package 22. Content package 22 may contain actual electronic content, marketing information, sample and promotional material, and other auxiliary material. The electronic content as mentioned above may comprise but is not limited to music, games, videos, movies, and personal computer programs. Only limited rights are given in the content package 22. These rights may include but are not limited to a one-time play right, a selected portion play right, or full rights for a predetermined time.

Users 14 have a filter 24 contained therein. Filter 24 has filter terms that essentially screen material from content provider 12 to determine whether to store the content item 26, or a subset thereof, at the user 14. Various types of filters may be used. In a less sophisticated filter, user 14 may program in his desired tastes that in turn become the filter terms. If the service is music, for example, only the music he chooses will be stored locally. On a more sophisticated level, a neural network having changing filter terms may be used. The neural network may learn the taste of the user through content selected to be purchased and the filter terms will thus change in response. Filter 24 may operate on predetermined key terms provided as part of the content item 26, such as with promotional material, or, in a more sophisticated filter, directly on the raw content item 26. A typical user configuration is described in further detail in FIG. 2.

Transport system 13 couples content providers 12 and users 14. Transport system 13 includes enough bandwidth to distribute the content packages 22 to users 14. For example, the transport system 13 may comprise a product having an infrastructure such as that for DIRECPC®, DIRECTV®, another satellite-based system, or over the air broadcast. The transport system 13 may share a satellite or satellite system with other satellite users. The distribution of electronic content to users 14 may take place any time. In addition, transport system 13 may comprise cable modem lines, telephone lines or Internet connections such as ISDN lines or T1 lines. For example, the connection between user 14 and clearinghouse 16 may be provided on a low bandwidth line such as a telephone or a video cable line. As is further described below, the transport system 13 may include a satellite or over the air network that includes a central transmitter, a broadcast satellite or terrestrial antenna, and a plurality of local receivers at the user 14. Suitable systems would be evident to those skilled in the art.

Clearinghouse 16 provides full access or rights to the electronic content sample in the content package 22 to users who wish greater or full rights in the content package 22. Clearinghouse 16 may, for example, provide a decryption key or enable a decryption key stored by user 14 to enable greater or full rights in the content package 22.

Clearinghouse 16 may provide information to marketing intelligence source 20. For example, clearinghouse 16 may link known characteristics of user 14 with the type of content requested to be purchased. This allows the content provider marketing intelligence to be used in determining content package 22. The marketing intelligence 20 may be performed linking specific user attributes or general user attributes with the content package 22. The filters 24 at the user 14 may further filter the electronic content desirable for the particular user 14 and store it. In this manner, if general attributes are used, specific data relating to the purchase of content need not be stored. Such a system increases the privacy of the user.

Fulfillment provider 18 obtains and tracks payment for the items requested from clearinghouse 16. Fulfillment provider 18 may provide user 14 with the decryption keys once the payment has been secured or enable the clearinghouse 16 to provide rights. Fulfillment provider 18 may also be a subscription service where a predetermined number of content packages 22 has been paid for on a regular basis prior to the distribution of the content packages. Fulfillment provider 18 may also provide a monthly or other regular bill to users 14. Also, fulfillment provider 18 may directly bill a credit card or checking account. Both fulfillment provider 18 and clearinghouse 16 may be nearly or fully automated and/or combined in a single entity.

Figure 2:
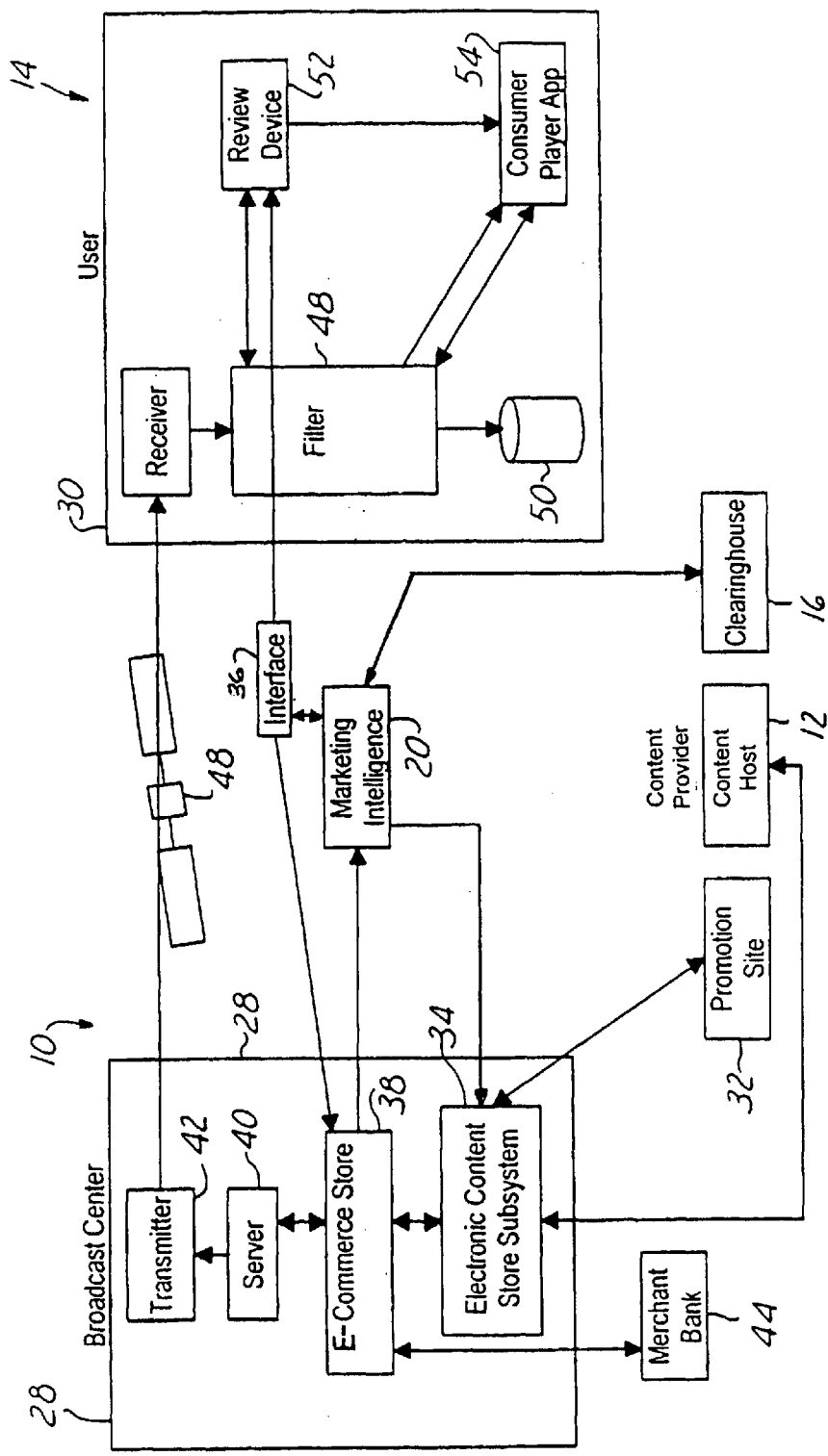
FIG. 2 is a detailed block diagram of the system.

Referring now to FIG. 2, a more detailed block diagram of the electronic content distribution system 10 is illustrated. In this diagram, a broadcast center 28 is coupled to user 14 and more specifically, to a user appliance 30. Generally, broadcast center 28 controls the distribution of content packages to users 14 and may also control the processing of payments. As illustrated, content provider 12, clearinghouse 16, and a promotion site 32 may be co-located and interfaced with broadcast center 28 and users 14.

Broadcast center 28 has an electronic content store subsystem 34, an e-commerce interface 36, a e-commerce store 38, a server 40, and a transmitter 42. Electronic content store subsystem 34 combines promotional information from promotion site 32 and electronic content from content provider 12. Electronic content store subsystem 34 combines suitable promotions from promotion site 32 that would likely be of interest for users of the electronic content from content provider 12. Determining which content would likely be of interest may be accomplished by applying marketing intelligence 20. The electronic content store subsystem 34 may be coupled directly to server 40 or may be coupled to server 40 through an e-commerce store 38 as illustrated. E-commerce store 38 may have an e-commerce interface 36 that is an actual website, a virtual website, a phone system, a wireless network or some other system for presenting promotional information. The e-commerce store 38 is a link between the user 14 and broadcast center 28. Server 40 stores the information to be transmitted to the user 14 through transmitter 42. As previously mentioned, transmitter 42 may be part of a satellite transportation system or a terrestrial system.

E-commerce store 38 may be coupled directly to a merchant bank 44 or, alternately, to an e-commerce interface 36 which in turn is coupled to a merchant bank 44. Thus, to pay for greater rights in the limited rights of the sample electronic content, merchant bank 44 may process credit card, debit card, or direct withdrawal from the user's bank account or any other means of registering payment. However, as mentioned above, the merchant bank may be replaced by a fulfillment provider that provides a monthly bill to the user. The greater rights may include unlimited plays of a song, game, video or movie or a predetermined number of plays.

E-commerce store 38 may also be coupled to marketing intelligence 20. Marketing intelligence is derived from the sum total activity of all users and represents a prediction of user interest in content. The promotion site 32 may provide advertising about the content package offered or about items that the marketing intelligence determines may be relevant to consumers interested in the content package. The marketing intelligence may be applied directly to the user 14 through the e-commerce interface or may be coupled with the content package 22 through transmitter 42.

User 14 has a user appliance 30 that includes a receiver 46 that receives information from transmitter 42. As mentioned above, receiver 46 may be coupled through a satellite 48, terrestrial, or other type of digital transport system having a suitable bandwidth. Receiver 46 is coupled to a filter 48. Filter 48 receives information from receiver 46 and may store the information on a local storage device 50.

A review device 52 is coupled to a consumer player application 54. The review device 52 may, for example, be a web browser or another type of on screen display device. The on screen display device may use a computer screen or a television screen. Consumer player application 54 may be a program or a physical device suitable for playing or reviewing the electronic content from storage device 50. The consumer player application, for example, may be an MPEG player, DVD player, or an audio clip playing device. The consumer player application 52 plays the electronic content sample from the local storage device 50. Alternately, the consumer player application 54, review device 52 and storage device 50 may be combined in a single unit.

Review device 52 may be coupled to content store website through an e-commerce interface 56. E-commerce interface 56 may, for example, be an Internet connection through telephone, cable or other communication link as previously mentioned. Of course, review device 52 may be coupled through the e-commerce interface 36 to the e-commerce store 38 through transmission through a transport system including satellite 48 and terrestrial.

In operation, generally the user 14 is provided with sample electronic content through the electronic content store subsystem 34. The sample may be part of a complete content package 22 stored in storage device 50. The sample may also be the full content package 22 with limited playback rights. Thus, to convert the sample content package into a full content package 22, the user 14 will pay for extended rights. The content package 22 may have marketing information and promotional information.

To start the process, the content provider 12 and promotion site 32 provide information to electronic content store subsystem 34. The electronic content store subsystem 34 combines the promotion information and the sample electronic content and stores it in server 40 before transmitter 42 transmits it to consumer 14. The electronic content store subsystem 34 may initiate the selection of the content package 22 to be offered based on marketing intelligence 20.

The promotional information and content package 22 is transmitted to the user through the transport system 13 such as through satellite 48 or other terrestrial system. In this system, preferably all the desired information for all users 14 is transmitted simultaneously to all the users 14. All the users receive the broadcast information through receiver 46. However, filter 48 stores only the information that is desirable to the user 14 as indicated by the local filter terms. Thus, filter 48 prevents all the information from being stored on the storage device 50. The storage device 50 caches the information.

The user, through review device 52, reviews the material stored on the storage device 50 to decide whether or not to purchase the content package 22. In the preferred embodiment, samples are provided to the user that have limited rights less than full rights. These items may be displayed to the user through icons or other indicator devices which may be selected for initiating review. The review device 52 may initiate the consumer player application 54 for review.

If the user 14 desires more rights in the content package 22, a buy transaction may be initiated. A fully executed buy transaction will convert the trial use to have greater rights such as full rights or payment for a desired amount of rights. The desire to purchase is communicated to the broadcast center 28. This communication may take place through the transport system 13. However, because this is not a bandwidth intensive operation, lower bandwidth communication may be used such as the Internet, phone lines, or other low bandwidth applications. The e-commerce store 38 processes the transaction through e-commerce interface 36 which may provide payment information to merchant bank 44. Once payment has been confirmed, a key may be provided to the user 14 to enable the purchased rights in the content package 22. For example, the consumer may be provided with a decryption key to unlock the content package 22. The decryption key may actually be stored locally or may be provided from clearinghouse 16. The purchased rights content package may already be on the storage device 50 or may be subsequently delivered through the transport system 13. It is also envisioned that physical delivery of a CD, floppy disk, flash memory card, DVD or other memory device may be provided upon payment. This may be done in a mail order type manner.

Providing the key for the user 14 may be the final step. However, it may be desirable to confirm fulfillment to clearinghouse 16 of a properly received content release.

While particular embodiments of the invention have been shown and described, numerous variations alternate embodiments will occur to those skilled in the art. Accordingly, it is intended that the invention be limited only in terms of the appended claims.

What is claimed is:

1. A method for distributing electronic content comprising the steps of:

in a broadcast center, distributing a plurality of electronic content having predetermined user rights less than full user rights associated therewith;

linking and distributing marketing information with each of said plurality of electronic content selections; and in a user appliance, receiving the plurality of electronic content and associated marketing information;

filtering said plurality of electronic content with predetermined filter terms;

accepting one or more of said plurality of electronic content to form a selected content subset as a function of said marketing information matching said predetermined filter terms; and storing the selected content subset for user review.

2. A method as recited in claim 1 further comprising the steps of:

reviewing the selected content subset; and purchasing one or more of the selected content subset.

3. A method as recited in claim 2 wherein in response to the step of purchasing one or more of the selected content subset, releasing greater rights to said one or more of the selected content subset.

4. A method as recited in claim 3 wherein said greater rights comprise full rights to use said one or more of the selected content subset.

5. A method as recited in claim 3 wherein the step of releasing greater rights comprises shipping a full electronic content package to the user.

6. A method as recited in claim 2 further comprising the step of confirming the purchase.

7. A method as recited in claim 2 further comprising the steps of storing marketing information in response to said step of purchasing.

8. A method as recited in claim 2 wherein the step of filtering comprises adjusting said filter terms in response to the step of purchasing.

9. A method as recited in claim 2 wherein the step of purchasing comprises providing an account number and contacting a merchant bank.

10. A method as recited in claim 2 wherein the step of purchasing comprises billing the user on a regular basis.

11. A method as recited in claim 1 further comprising the step of distributing promotional material with said plurality of electronic content.

12. A method as recited in claim 1 wherein the step of filtering comprises the step of prompting the user for filter terms.

13. A method as recited in claim 1 wherein the step of distributing comprises the steps of distributing a plurality of electronic content having limited user rights associated therewith.

14. A method as recited in claim 13 wherein said limited rights is selected from the group consisting of a one time play right, a selected portion play right, and full rights for a predetermined time.

15. A system for distributing electronic content packages comprising:

a content provider having a plurality of electronic content;

a broadcast center coupled to the content provider for receiving said plurality of electronic content and transmitting said plurality of electronic content with marketing information, said plurality of electronic content having predetermined limited rights less than full rights associated therewith;

a user appliance having a filter therein, said appliance coupled to said broadcast center for receiving said plurality of electronic content with marketing information, said filter filtering the plurality of electronic content with predetermined filter terms and accepting one or more of said plurality of electronic content to form a selected content subset as a function of said filter terms and marketing information.

16. A user appliance for a system comprising;

a receiver receiving a plurality of electronic content and associated marketing information, with limited rights in the electronic content;

a filter coupled to the receiver;

a storage device coupled to said filter, said filter filtering the plurality of electronic content with predetermined filter terms and accepting one or more of said plurality of electronic content and its associated limited rights to form a selected content subset as a function of said filter terms and the marketing information, and after accepting, storing said selected content subset on said local storage device, said associated limited rights capable of being converted to greater rights upon receiving a decryption key without receiving additional electronic content.

17. A user appliance as recited in claim 16 further comprising a review device coupled to said storage device for reviewing said electronic content subset and initiating a buy transaction.

18. A method for distributing electronic content to users in a system comprising:

simultaneously broadcasting to each user appliance of the system a plurality of electronic content samples having predetermined user rights less than full user rights associated therewith;

distributing marketing information with each of said plurality of electronic content samples;

receiving the plurality of electronic content samples and associated marketing information;

filtering the plurality of electronic content samples with predetermined filter terms; and accepting one of said plurality of electronic content samples to form a selected sample as a function of the marketing information matching said filter terms; and storing the selected sample for user review.

* * * * *